Dec. 21, 1948.                R. W. MOORE                 2,456,982
                              MOTOR CONTROL
                           Filed Feb. 27, 1945
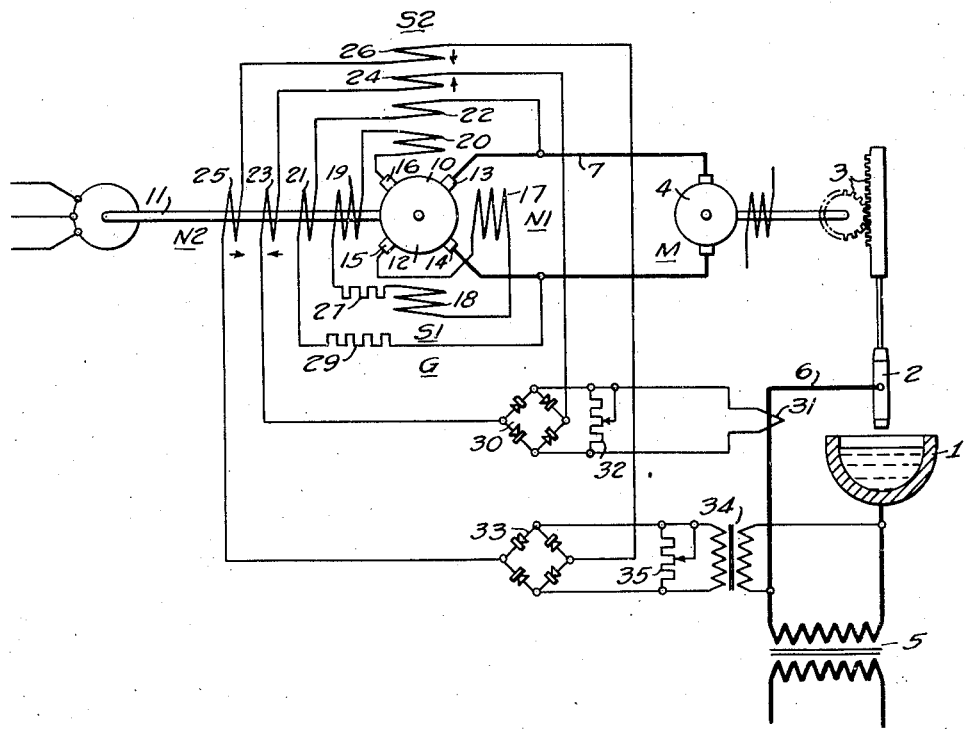
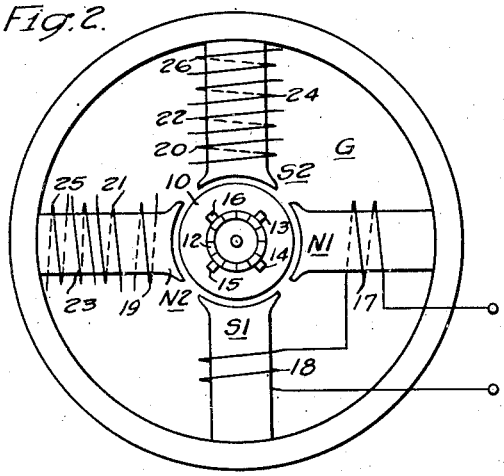
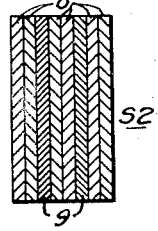
WITNESSES:                                        INVENTOR
                                              Raymond W. Moore.
                                                     BY
                                              Paul E. Friedemann
                                                  ATTORNEY Patented Dec. 21, 1948

2,456,982

UNITED STATES PATENT OFFICE 2,456,982

MOTOR CONTROL

Raymond W. Moore, Edgewood, Pa., assignor to Westinghouse Electric Corporation, East Pittsburgh, Pa., a corporation of Pennsylvania Application February 27, 1945, Serial No. 579,920

8 Claims. (Cl. 318—143)

My invention relates to motor control systems of the variable voltage type and, in one of its more specific aspects, to systems for controlling the electrode-adjusting motor of arc furnaces.

It is among the objects of my invention to provide a variable voltage control which combines greatly reduced space requirements, as compared with known systems, with a regulating performance of high sensitivity, low time constant and little or no hunting tendency.

Another object of the invention, especially in conjunction with those above-mentioned, is to provide a self-regulating or closed-cycle system which embodies self-limiting voltage characteristics so that, despite a quick build-up and change in variable voltage under steady-state operating conditions, the voltage impressed on the controlled motor is prevented from reaching excessive values during starting periods or during periods of transient abnormal conditions.

A still further object of my invention is to generate the motor voltage by means of a rotary machine which operates also as the device for controlling and/or limiting such voltage. In other words, this invention aims also at devising a system in which a single generator performs both a voltage-generating and a voltage-regulating function.

Another object involved in my invention is to provide a control system, for the electrode hoisting motor of an arc furnace, which operates automatically to position the electrodes so that the power consumption of the furnace is maintained at a desired value.

My invention involves also the provision of a special direct-current generator, applicable in variable voltage systems of the kind above referred to, which combines within a single rotary machine a main generator portion for producing a variable output voltage, and a control or regulating generator portion for controlling the output voltage, both generator portions having a common armature whose commutator has separate and angularly displaced sets of brushes correlated to the two respective generator portions. It is further aimed at designing a dual generator of this type in such a manner as to obtain a sensitive control operation of a high rate of amplification under normal operating conditions while automatically limiting the voltage amplitude during occurrence of transitory or starting phenomena.

Still another object, subsidiary to those mentioned in the preceding paragraph, is to devise a dual generator in which the main and regulating generator portions form part of a single magnetic field structure in which all magnet poles have the same, or substantially the same, mechanical dimensions but are different in magnetic respects so that the magnetization characteristic of each generator portion is best suited for its particular function.

These objects, as well as the means provided by the invention for achieving them, will be apparent from the following description of the embodiment exemplified by the drawing.

Figure 1 of the drawing shows the circuit diagram of a system for controlling the electrode adjusting motor of an arc furnace;

Fig. 2 represents schematically and more in detail the generator used in the control system of Fig. 1; while Fig. 3 is a diagrammatic cross-section through one of the four pole structures of the same generator, the section being taken along a radial plane extending perpendicular to the plane of illustration of Fig. 2.

Referring to Fig. 1, numerals 1 and 2 represent two electrodes of different polarity of an arc furnace, the electrode 1 being formed by the receptacle of the furnace. Electrode 2 is provided with a hoisting device, here represented by a rack and gear mechanism 3, which is driven by the armature 4 of a direct-current motor M. The electrodes are energized by alternating current from a power transformer 5 through a load circuit 6. It will be understood that while a single phase load circuit is illustrated, the furnace may be provided with several movable electrodes arranged in a polyphase circuit.

The motor M is provided with constant field excitation from a suitable direct-current source (not illustrated). The armature 4 of motor M is energized in a main control circuit 7 by controllable direct-current voltage from a generator G of special design. According to Fig. 2, the magnetizable frame structure of this generator has four salient poles, denoted by N1, S1, N2, and S2, respectively. The structure is of the customary laminated design. However, while the laminations of poles N1 and S1 and of the yoke portion of the frame structure are composed entirely of dynamo steel, the two poles N2 and S2 are so designed that their magnetic reluctance becomes very much higher at a lower value of magnetic induction than that of poles N1 and S1. In order to obtain this higher reluctance and hence saturation at a lower magnetic induction while giving all four poles the same mechanical dimensions the laminations of poles N2 and S2 consist partly of dynamo steel and a material of higher reluctance. According to the section shown in Fig. 3, the laminations denoted by 8 are formed of the same steel as the laminations of poles N1 and S2, while the laminations denoted by 9 consist of brass. It will be understood that other means such as reducing the cross-sectional area of a portion of the poles N2—S2 may be employed to obtain the lower saturation value of magnetic induction as compared with N1—S1.

Still referring to Fig. 2, the armature of the generator is denoted by 10, and the appertaining shaft by 11. The commutator 12 of armature 10 is provided with four brushes 13, 14, 15, and 16. Poles N1 and S1 are each provided with a main field winding 17 and 18, respectively. The generator output voltage, controlled by the magnetization induced in poles N1 and S1 by field windings 17 and 18, appears across the brushes 13 and 14 (main brushes). The voltage generated in the armature under control by the field of poles N2 and S2 appears across brushes 15 and 16 (regulator brushes) and is mainly used for providing the field excitation of windings 17 and 18. In order to control the regulating voltage across brushes 15 and 16, each of the two poles N2 and S2 has four field windings whose connection will be described presently with reference to the circuit diagram of Fig. 1.

According to Fig. 1, each of poles N2 and S2 has a feed-back field winding 19 or 20, a stabilizing field winding 21 or 22, a current-responsive field winding 23 or 24, and a voltage-responsive field winding 25 or 26. The self-exciting field windings 19 and 20 are series connected with the main field windings 17 and 18 between the regulator brushes 15 and 16 of the generator. A calibrating resistor 27 is preferably arranged in this series connection in order to adjust the resistance line of the windings 19 and 20 so that it coincides approximately with the no-load saturation curve of the magnetic circuit which extends through the two poles N2 and S2. Due to this resistance rating, the field windings 19 and 20 serve as amplifying feed-back windings and tend to maintain the regulator voltage between brushes 15 and 16 at any value determined by the resultant control effect of field windings 23, 25 and 24, 26 on poles N2 and S2, respectively. The stabilizing windings 21 and 22 are connected through a calibrating resistor 29 across the output or main brushes 13 and 14 of the generator and serve to perform an auxiliary function, to be mentioned in a later place. The current-responsive field windings 23 and 24 are connected in series with each other across the output terminals of a rectifier 30. The rectifier 30 receives its energy from a current transformer 31 which measures the load current in the circuit 6 of the arc furnace. An adjusting resistor 32 is provided for selecting a proper ratio between the rectified output current traversing the field windings 23, 24 and the load current measured by the transformer 31. The voltage-responsive field windings 25 and 26 of generator G are connected in series with each other across the output terminals of a rectifier 33 which receives its energization from a voltage transformer 34 connected across the electrodes of the arc furnace. Hence, the excitation of field windings 25 and 26 varies in proportion to the load voltage of the furnace, the proportion being adjustable by means of a resistor 35.

The two field windings 23 and 25 of generator pole N2 and the corresponding two windings 24 and 26 on pole S2 are equal in number of turns and connected in opposition to each other. Consequently, the two respective windings on each pole act differentially and are balanceable relative to each other. When the load current of the furnace has a proper ratio to the load voltage, the resultant magnetic flux induced in the poles N2 and S2 by the current-responsive and voltage-responsive windings is zero. When the arc current increases above the correct value, the excitation of windings 23 and 24 will predominate over the excitation of the respective windings 25 and 26 so that the poles N2 and S2 are magnetized in the direction necessary for producing a regulating voltage across brushes 15 and 16, which, in turn, causes the main field windings 17 and 18 to control the magnitude and direction of the voltage across motor armature 4 with the effect of adjusting the electrode 2 for a reduction in load current. Similarly a departure of the arc voltage from the correct value will cause the excitation of field windings 25 and 26 to predominate, thereby reversing the direction of the regulating voltage across brushes 15 and 16, which, in turn, causes the generator output voltage between brushes 13 and 14 to energize motor M for a corrective change in the electrode position.

The stabilizing field windings 21 and 22 have the effect of reducing or eliminating hunting tendencies in the control system in order to prevent the electrodes from overshooting the correct position. The polarity of excitation of windings 21 and 22 depends on the polarity of the generator output voltage across brushes 13 and 14. The stabilizing windings 21 and 22 are so connected that each of them acts differentially with respect to the resultant effect of the appertaining field windings 23 and 25 or 24 and 26. The excitation of the stabilizing field windings increases as the back E. M. F. of the electrode-adjusting motor 4 increases with speed. Hence, when during a regulating performance the two control fields 23, 25 and 24, 26 approach a balance, the differential effect of the appertaining stabilizing winding quickly reduces the regulator voltage between brushes 15 and 16, and hence also the main output voltage between brushes 13 and 14. Due to this effect, the speed of motor 4 is smoothly reduced to zero so that an overshooting of the motor and of the electrode position is prevented. When the new balance condition is reached, the resultant magnetization induced by the four field windings of each pole N2 and S2 is zero.

During normal operating conditions, all four poles of the generator are magnetized within the straight portion of their magnetic characteristic. When starting, or when it becomes necessary to move the electrodes a considerable extent, the above-described control function might tend to produce an undesirably high motor voltage, and hence an excessive speed of the electrode-adjusting motor, which, in turn, may lead to undue stresses on the electric equipment or the mechanical parts of the system. Due to the fact, however, that the two poles N2 and S2, appertaining to the regulating portion of the generator, have an increased magnetic reluctance, the increase of regulating voltage appearing across brushes 15 and 16 is limited in accordance with the reduced saturation characteristic of the poles N2 and S2. Consequently, the output voltage of the generator and the corresponding speed of the adjusting motor are limited to a safe value.

It will be realized from the foregoing that with a system and generator according to the invention, the voltage applied to the electrode motor is controlled fully by the electric and magnetic characteristics of the generator and its appertaining circuits, without the inter-position of relays or the like contact devices. The speed of response of the voltage applied to the electrode motor is determined by the time constants of the various field circuits of the generator, and it will be understood that there is considerable latitude in selecting and adjusting these time constants by giving various proportions to the strength of these different fields, for instance, by the exemplified application of external calibrating resistors. Consequently, the speed and time characteristics of the system can readily be controlled and chosen in accordance with the requirements of each particular application.

In addition to these advantages, the generator G, as described in the foregoing, performs the function of a double stage amplifier. This generator, by virtue of the described design, embodies within a single machine two differently operating generator portions. One portion, comprising the field poles N2 and S2, and the brushes 15 and 16 represents an amplifying generator which provides a controlled regulating voltage; while another generator portion, comprising the field poles N1 and S1 and the brushes 13 and 14, represents an ordinary generator, which under control by the just-mentioned regulating voltage provides the excitation proper for the motor M to be controlled. Despite its double function, the generator is structurally similar to ordinary four-pole machines and requires virtually no more space than a single generator of conventional type.

It will be understood by those skilled in the art that the invention permits of various changes and modifications without departure from the principles involved and within the essential features as set forth in the claims attached hereto.

I claim as my invention:

1. A control system for regulating load adjusting means of an electric load circuit, comprising a direct-current adjusting motor; a generator having a field structure with four poles of alternately different polarities and a four-circuit armature having a commutator with two main brushes and two regulator brushes, said main brushes being connected to said motor to energize it by controlled output voltage, two adjacent poles of said structure being provided with main field windings respectively for controlling said voltage, said two other poles being each provided with a feed-back field winding, a stabilizing field winding, a current-responsive field winding and a voltage-responsive field winding, said feed-back field winding being connected with said main field windings across said regulator brushes and having a resistance characteristic approximately coincident with the no-load magnetization characteristic of said other poles, said stabilizing field winding being connected across said main brushes, said current-responsive field winding and said voltage-responsive field winding being differential and balanceable relative to each other; circuit means connected to said current-responsive field winding for exciting it in dependence upon the current of the load-circuit; and circuit means connected to said voltage-responsive field winding for exciting it in dependence upon the voltage of the load-circuit.

2. A system for controlling load adjusting means of an electric circuit, comprising a direct-current adjusting motor; a generator having a four-pole field structure with two main poles and two regulator poles, said regulator poles having higher magnetic reluctance than said main poles, a four-circuit armature having a commutator with two main brushes and two regulator brushes, said main brushes being connected to said motor to energize it by controlled output voltage, said main poles being provided with main field windings respectively for controlling said voltage, said regulator poles being each provided with two mutually differential and balanceable field windings; circuit means connected to one of said differential field windings for exciting it in dependence upon the current of the circuit; and circuit means connected to said other differential field winding for exciting it in dependence upon the voltage of the circuit.

3. A control system for regulating load adjusting means of an electric load circuit, comprising a reversible direct-current motor for driving the adjusting means; a direct-current generator disposed for providing reversible voltage for said motor and having a field structure with four poles and a four-circuit armature with a commutator having two main brushes and two regulator brushes, said main brushes being connected to said motor, two adjacent poles of said structure being provided with main field windings respectively for controlling said voltage, said two other poles having higher magnetic reluctance than said first two poles and being provided with a feed-back field winding, a stabilizing field winding, a current-responsive field winding and a voltage-responsive field winding, said feed-back field winding being connected with said main field windings across said regulator brushes and having a resistance characteristic approximately coincident with the no-load saturation characteristic of said other poles, said stabilizing field winding being connected across said main brushes, said current-responsive field winding and said voltage-responsive field winding being differential and balanceable relative to each other; circuit means disposed between said load circuit and said current-responsive field winding for exciting the latter in dependence upon the load current, and circuit means disposed between said load circuit and said voltage-responsive field winding for exciting the latter in dependence upon the load voltage.

4. A direct-current generator, comprising, a field structure with at least four poles of alternately different polarity, two adjacent ones of said poles having higher magnetic reluctance than two other poles, an armature having a commutator with main brushes and regulator brushes, said regulator brushes being angularly spaced from said main brushes and arranged to provide field voltage controlled by excitation of said poles of higher reluctance while said main brushes are arranged to provide output voltage controlled by excitation of said other poles, field windings disposed on said poles of higher reluctance to provide control excitation therefor and main field windings disposed on said other poles and connected across said regulator brushes to receive excitation due to said field voltage.

5. A direct-current generator, comprising a field structure with at least four poles of alternately different polarity, two adjacent ones of said poles having higher magnetic reluctance than two other poles, an armature having a commutator with main brushes and regulator brushes, said regulator brushes being angularly spaced from said main brushes and arranged to provide field voltage controlled by excitation of said poles of higher reluctance while said main brushes are arranged to provide output voltage controlled by excitation of said other poles, main field winding disposed on said other poles and connected between said regulator brushes to be excited by said field voltage, said poles of higher reluctance having a feed-back field winding also connected between said regulator brushes and a stabilizing winding connected across said main brushes, and separately excited winding means disposed on said poles of higher reluctance for providing condition-responsive excitation therefor.

6. A direct-current generator, comprising a field structure with four poles of alternately different polarity, two adjacent ones of said poles having higher magnetic reluctance than the two other poles, an armature having a commutator with main brushes and regulator brushes, said regulator brushes being angularly spaced from said main brushes and arranged to provide field voltage controlled by excitation of said poles of higher reluctance while said main brushes are arranged to provide output voltage controlled by excitation of said other poles, main field windings disposed on said other poles and connected across said regulator brushes to be excited by said field voltage, said poles of higher reluctance being provided with a field winding series-connected with said main field windings, a stabilizing winding connected across said main brushes, and two mutually balanceable field windings for connection to separate control circuits respectively so as to control said output voltage in accordance with the differential effect of said circuits.

7. A direct-current generator, comprising a field structure with four equally spaced poles of alternately different polarity and substantially equal mechanical dimensions, two adjacent ones of said poles having higher magnetic reluctance than two other poles, an armature having a commutator with main brushes and regulator brushes, said regulator brushes being angularly spaced from said main brushes and arranged to provide field voltage controlled by excitation of said poles of higher reluctance while said main brushes are arranged to provide output voltage controlled by excitation of said other poles, main field windings disposed on said other poles and connected between said regulator brushes to be excited by said field voltage, and field windings disposed on said poles of higher reluctance for exciting them in accordance with controlling phenomena.

8. A direct-current generator for providing controllable and reversible voltage, comprising a field structure with equally spaced poles of alternately different polarity and substantially equal mechanical dimensions, two adjacent ones of said poles having higher magnetic reluctance than two other poles, an armature having a commutator with main brushes and regulator brushes, said regulator brushes being angularly spaced from said main brushes and arranged to provide field voltage controlled by excitation of said poles of higher reluctance while said main brushes are arranged to provide output voltage controlled by excitation of said other poles, main field windings disposed on said other poles and connected between said regulator brushes to be excited by said field voltage, and four field windings disposed on each of said poles of higher reluctance to provide excitation therefor, said four field windings consisting in a field winding series-connected with said main field windings, a stabilizing winding connected across said main brushes, and two mutually differential and balanceable field windings for connection to respective control circuits.

RAYMOND W. MOORE.

REFERENCES CITED

The following references are of record in the file of this patent:

UNITED STATES PATENTS

| Number | Name | Date |
|---|---|---|
| 1,447,236 | Chaney | Mar. 6, 1923 |
| 1,535,595 | Fortescue | Apr. 28, 1925 |
| 1,976,499 | Hochstetter | Oct. 9, 1934 |
| 1,989,546 | Chapman | Jan. 29, 1935 |
| 1,994,609 | Hobart | Mar. 19, 1935 |
| 2,007,751 | Chapman | July 9, 1935 |
| 2,030,678 | Bergman | Feb. 11, 1936 |
| 2,070,949 | Lincoln et al. | Feb. 16, 1937 |
| 2,259,958 | Levy | Oct. 21, 1941 |
| 2,311,462 | Neal | Feb. 16, 1943 |
| 2,354,911 | Edwards | Aug. 1, 1944 |
| 2,372,075 | Formhals | Mar. 20, 1945 |

FOREIGN PATENTS

| Number | Country | Date |
|---|---|---|
| 373,735 | Great Britain | June 2, 1932 |
| 629,620 | France | Aug. 1, 1927 |